United States Patent [19]

Franklin

[11] Patent Number: 4,642,929
[45] Date of Patent: Feb. 17, 1987

[54] ARCHERY FISH POINT

[76] Inventor: Dwaine R. Franklin, 1845 Arizona Ave., Yuma, Ariz. 85364

[21] Appl. No.: 829,942

[22] Filed: Feb. 18, 1986

[51] Int. Cl.⁴ ............................................. A01K 81/00
[52] U.S. Cl. .......................................... 43/6; 273/419
[58] Field of Search ................ 43/6, 5; 273/419, 421

[56] References Cited

U.S. PATENT DOCUMENTS

| | | | |
|---|---|---|---|
| 2,540,387 | 2/1951 | Butler | 43/6 |
| 2,599,626 | 6/1952 | Gottschalk | 43/6 |
| 2,725,656 | 12/1955 | Schmidt | 43/6 |
| 2,859,970 | 11/1958 | Doonan | 273/419 |
| 2,904,338 | 9/1959 | Podufal | 273/419 |
| 3,014,305 | 12/1961 | Yurchich | 43/6 |
| 3,022,077 | 2/1962 | Doonan | 273/419 |
| 3,036,395 | 5/1962 | Nelson | 43/6 |
| 3,164,385 | 1/1965 | Shure | 273/419 |
| 3,168,313 | 2/1965 | Lint | 273/419 |
| 3,600,835 | 8/1971 | Hendricks | 43/6 |
| 3,945,642 | 3/1976 | Henthorn | 43/6 |

Primary Examiner—Gene P. Crosby
Attorney, Agent, or Firm—LaValle D. Ptak

[57] ABSTRACT

An archery fish point for arrows having a floating barb with an extended straight portion adapted to lie along the shaft of the arrow and terminating in a loop which encircles a reduced diameter elongated support member attached to the penetrating point. In flight and during penetration of the point, the barb lies flat along the shaft. When the shaft is pulled in the reverse direction, the barb extends outwardly to an angle determined by the relative sizes of the inner diameter of the loop on the barb and the diameter of the support member.

18 Claims, 7 Drawing Figures

U.S. Patent      Feb. 17, 1987      4,642,929
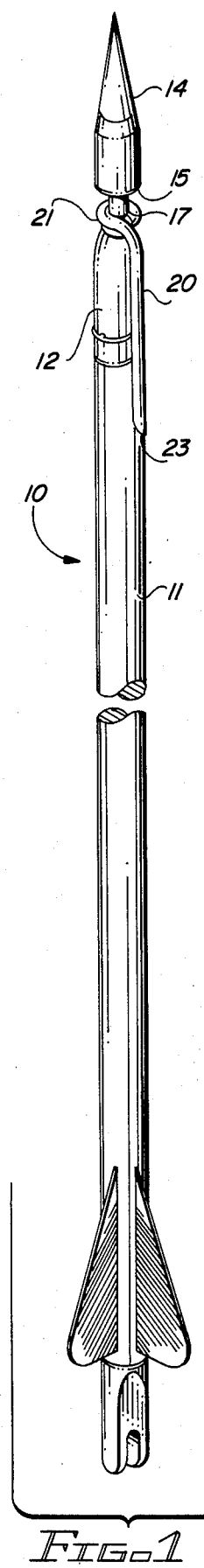
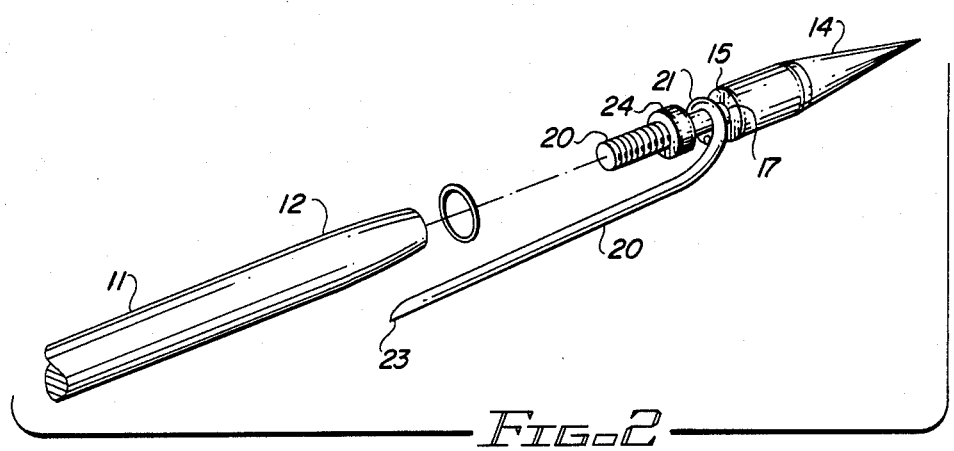
FIG.-2
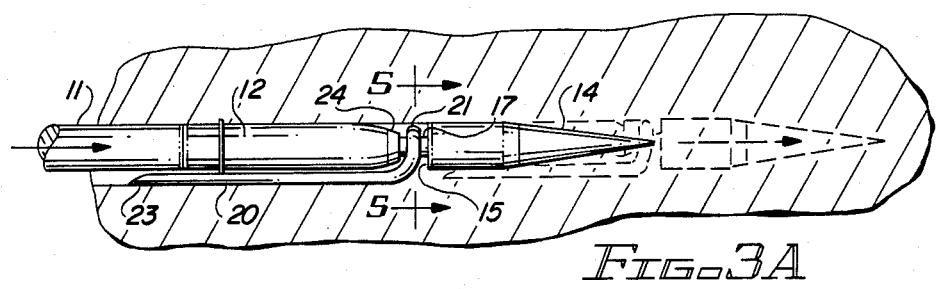
FIG.-3A
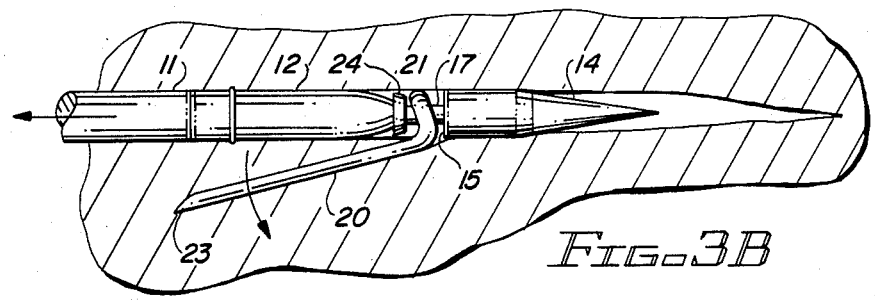
FIG.-3B
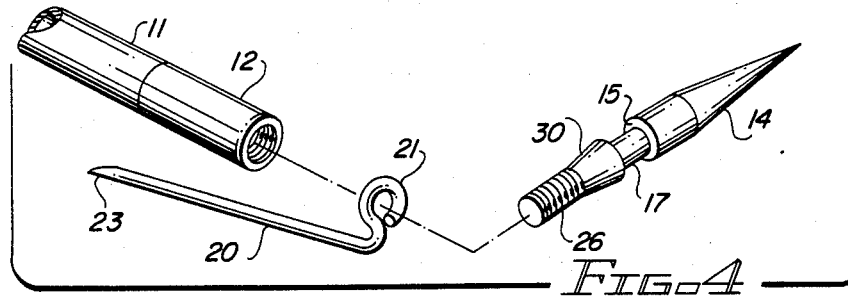
FIG.-4
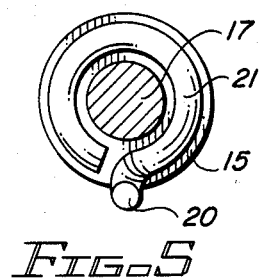
FIG.-5
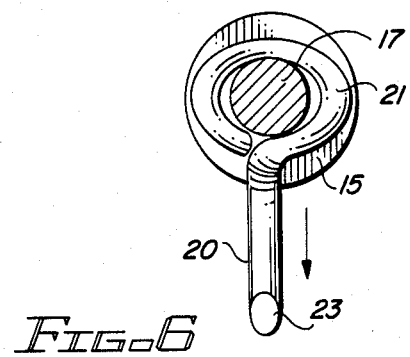
FIG.-6
FIG.-1

ARCHERY FISH POINT

BACKGROUND

This invention relates to arrow heads and more particularly to an arrow head specifically designed for use in fishing.

Bow and arrow fishing is becoming an increasingly popular sport. It has been found, however, that the arrow head or point for use in fishing must be different from points used in target shooting and other types of hunting because of special considerations. These considerations include the water itself which is struck by the arrow, as well as the nature of a fish after it has been pierced by the arrow and undergoes subsequent struggles when attempts are made to remove it from the water. Most known fish points or fishing arrow heads have outwardly extending barbs on them to inhibit withdrawal of the point and arrow after it has passed through the fish or becomes imbedded in the flesh of the fish.

The barbs themselves, however, create other problems which detract from their usefulness. For fish points or arrow heads where the barbs are in a permanently extended configuration, the barbs frequently cause planing or deflection of the arrow when the arrow enters the water. It is difficult to anticipate the exact amount of deflection which is going to take place or to anticipate in what direction this deflection will occur; so that substantial inaccuracies in shooting result. This can be very frustrating to a fisherman who has little or no control over such deflection.

Another disadvantage of permanently extended barbs is that they tear a relatively large hole in the skin and flesh of the fish. In some instances, the flesh is sufficiently weakened that the barb is not capable of holding in the flesh as the fish thrashes about; and the fish tears free even though a barb is used.

Two patents which are directed to fishing points of the types commonly used today are the patents to Podufal U.S. Pat. No. 2,904,338; and Shure U.S. Pat. No. 3,164,385. Both of these patents disclose arrow heads or fish points in which a wire type of barb is permanently extended when the arrow is in flight, enters the water and ultimately penetrates the fish. These permanently extended barbs do cause some planing of the arrow when it enters the water; and in addition, they cut a relatively large hole in the fish as the point penetrates the fish.

Other patents which disclose fishing arrow heads or fish points in which the barbs are fully extended during the flight of the arrow, and consequently are subject to the same disadvantages mentioned in conjunction with Podufal and Shure, are the patents to Schmidt U.S. Pat. No. 2,725,656; Doonan U.S. Pat. No. 3,022,077 and Lint U.S. Pat. No. 3,168,313. These latter patents have an additional capability of collapsing or closing the barbs to permit withdrawal of the arrow from the fish without causing further tearing of the flesh. The disadvantages of Podufal and Shure during the flight of the arrow to the ultimate fish target, however, are present in all of these patents since the barbs are extended during the arrow flight.

Prior art patents which recognize some of the problems created by extended barbs and attempt to overcome this problem and still provide a barb which prevents withdrawal of the arrow after it hits the target are the patents to Doonan U.S. Pat. No. 2,859,970; Nelson U.S. Pat. No. 3,036,395; Yurchich U.S. Pat. No. 3,014,305; and Hendricks U.S. Pat. No. 3,600,835. All four of these patents disclose some means for holding barbs in close proximity to the shaft of the arrow while it is in flight and while it passes through the water. The barbs then are released by mechanisms built into the point after the arrow penetrates the target. The structures of the penetrating points of these four patents, however, are all relatively complex. This causes the points to be expensive and subject to failure.

Two other prior art patents which are directed to fishing arrow heads and which attempt to overcome the problems of the patents mentioned above are Gottschalk U.S. Pat. No. 2,599,626; and Butler U.S. Pat. No. 2,540,387. Both of these patents also are directed to relatively complex arrow head structures. In Gottschalk, the point has a diagonal hole drilled through it and a curved, elongated barb with an enlarged head on it is placed into the hole. The barb may or may not lie relatively close to the arrow during flight since it is held in place by frictional forces in the hole. If it does not lie close to the shaft, the point of Gottschalk is subject to all of the disadvantages of the prior art mentioned above for those patents where an extended barb can result in planing and the tearing of large holes in the flesh of the fish. If the barb does lie close to the shaft in flight (and this is simply a matter of chance) deflection of the arrow when it hits the water is substantially minimized. The structure of Gottschalk, however, requires the drilling of a hole through the arrow head point and additional assembly steps to insert the barb and bend it to keep it from falling out. Once the barb is in place, it is necessary to tie a string around the barb to pull the arrow back out of the fish, as illustrated in FIG. 5.

The Butler patent is directed to a highly specialized arrow head having a pivoted barb near its point. The barb normally lies back against the remainder of the point which has a relatively flat surface at an acute angle. Consequently, when the point hits the water, deflection or planing of the head invariably occurs. The pivot is subjected to a great deal of pressure when the barb is subjected to reverse forces; and because the pivot is located very near the point, significant potential weaknesses exist as a result of the inherent small dimensions of the pivot and the closeness of the pivot to the end of the barb which are necessary in order for the barb to lie against the remainder of the point while the arrow is in flight and is passing through water and the ultimate fish target.

It is desirable to provide a simple, inexpensive fishing point which overcomes the disadvantages of the prior art. Such a point should minimize unwanted deflection of the arrow as it enters and passes through water into the target, while also minimizing the tearing of flesh of the target. At the same time, however, the barb should exhibit maximum holding characteristics when it is subjected to a reverse pull through the struggle of the fish and removal of the fish from the water.

SUMMARY OF THE INVENTION

It is an object of this invention to provide an improved fishing arrow head.

It is another object of this invention to provide an improved archery fish point for arrows.

It is additional object of this invention to provide an archery fish point of simple construction having a floating barb.

It is a further object of this invention to provide an archery fish point having a floating barb which lies parallel to and substantially against the arrow shaft during the flight of the arrow and which extends into a holding position in response to reverse pull of the arrow after it has entered the target.

In accordance with the preferred embodiment of this invention, an archery fish point includes a main body member with a central axis and having a penentrating point terminating in a rear shoulder. A cylindrical barb support is attached to the center of the rear shoulder and has a cross-sectional dimension in a plane perpendicular to the axis of the main body member which is less than a similar cross-sectional dimension of the shoulder. A floating barb, having an elongated barb portion attached at one end to a ring is mounted with the ring encircling the barb support member. The inner diameter of the ring of the barb is greater than the outer diameter of the support member and the second end of the support member is attached to an arrow shaft.

BRIEF DESCRIPTION OF THE DRAWING

FIG. 1 is a perspective view of a preferred embodiment of the invention in place on an arrow shaft;

FIG. 2 is an exploded view of a preferred embodiment of the invention;

FIGS. 3A and 3B illustrate different positions of different parts of the embodiment of FIG. 2, showing its manner of use;

FIG. 4 is an exploded view of another embodiment of the invention; and

FIGS. 5 and 6 show details of the embodiment of FIG. 2 taken along the lines 5—5 of FIG. 3A and FIG. 6 shows a second position as seen in FIG. 3B.

DETAILED DESCRIPTION

Reference now should be made to the various figures of the drawing in which the same reference numbers are used throughout the various figures to designate the same or similar components. FIG. 1 shows a perspective view of an arrow 10 having a conventional shaft 11 made of fiberglass, or other suitable material, to which a metal, internally-threaded, point-attaching sleeve 12 is connected at the forward end. A fish point 14 of a sharp conical shape terminates in a rear shoulder 15 to which a reduced diameter barb support section 17 is attached. The barb support section 17 extends a short distance to the rear of the shoulder 15 and terminates in an enlarged shoulder abutment 24, which in turn has a rearwardly-extending externally-threaded connector 26 attached to it. The connector 26 is threaded into the internally threaded sleeve 12 to attach the point 14 to the arrow shaft 11 in the position illustrated in FIGS. 1 and 3. This type of attachment is commonly used for removable points of the type used in hunting and the arrow 10 with the sleeve 12 is of otherwise standard configuration.

A floating barb in the form of a single piece of cylindrical spring steel material or the like is placed on the barb support section 17. This barb comprises a straight, elongated portion 20 which terminates at its forward end in a ring 21. The ring 21 then encircles the support section 17. The internal diameter of the ring 21 is greater than the external diameter of the section 17, as is most apparent from an examination of FIG. 5. Consequently, the barb 20/21 "floats" or is free to move from the position shown in FIGS. 1 and 3A to an extended position, such as illustrated in FIGS. 3B and 6. A satisfactory material for the barb 20/21 is spring steel wire having a cross-section of 0.090 or 0.10 inches.

When the arrow is shot, and throughout its passage through air and into the water and ultimately into the target, the looseness of the ring 21 on the section 17, coupled with the forces propelling the arrow, causes the straight portion 20 of the barb to lie against the shaft 11, as shown most clearly in FIG. 1. Consequently, deflecting forces as the arrow enters the water and passes through it are minimal and inconsequential. Similarly, as the arrow passes into the flesh of the target, as illustrated in FIG. 3A, a minimum hole in the flesh of the fish (or other target) is caused since the diameter of the portion 20 of the barb is quite small compared to the maximum diameter of the point 14 at the shoulder 15. This permits deeper penetration of the point than with other known fish points.

After the point 14 either has passed entirely through the fish or becomes imbedded in the flesh, any reverse pull on the shaft 11 of the arrow causes a tip 23 on the portion 20 to engage the flesh of the fish. This causes rotation of the barb in a counterclockwise direction (as viewed in FIGS. 3A and 3B) to an extended position. The limit of this rotation is determined by the diameter of the section 17 and the inner diameter of the ring 21, as shown most clearly in FIG. 6. The tip 23 of the barb 20 is cut at an acute angle facing the shaft 11 to ensure that it catches into the flesh of the fish and pulls the barb 20 to an extended position. This securely holds the point in the fish, in spite of significant forces which are created as the fish thrashes about and as the arrow is pulled back by a line attached to it to retrieve the fish.

After retrieval, the shaft 11 is pushed entirely through the fish, if this has not already occurred, and the point is unscrewed to remove it from the arrow. The shaft 11 and sleeve 12 then may be withdrawn without any further damage to the flesh. Reassembly of the point 14 on the shaft 11 in the manner described previously readies the arrow for subsequent reuse.

FIG. 4 illustrates an alternative embodiment to the one which has been described above. Most of the portions of the embodiment shown in FIG. 4 are identical to the ones described in conjunction with FIGS. 1, 2 and 3. The abutment 24 of the embodiment of FIGS. 1, 2, and 3, however, has been replaced by a reverse, conical tapered abutment 30, as illustrated in FIG. 4. This permits the barb 20 and ring 21 to be performed externally of the section 17 out of spring steel or similar material. Assembly then is effected by pressing the ring 21 over the tapered shoulder 30 from left to right, as viewed in FIG. 4, until the ring snaps into place over the reduced diameter section 17. In all other respects, assembly and use of the embodiment shown in FIG. 4 are the same as embodiment shown in FIGS. 1, 2, and 3.

The foregoing description, taken in conjunction with the different figures of the drawing, is to be considered illustrative of the invention and not as limiting. Various changes and modifications will occur to those skilled in the art without departing from the true scope of the invention as defined in the claims.

I claim:

1. An archery fish point for arrows including in combination:
   a main body member having a central axis and including a penetrating point terminating in a rear shoulder portion;
   a barb support member having first and second ends and having a cross-sectional dimension in a plane perpendicular to the axis of said body member which is less than such a crosssectional dimension of the shoulder portion of said main body member, said support member attached at the first end thereof to the center of said shoulder portion;

floating barb means having a elongated barb portion attached at one end to a ring portion, with the ring portion thereof substantially encircling said support member and having an inner diameter greater than the maximum cross-sectional dimension of said support member; and means for attaching the second end of said support member to an arrow shaft.

2. The combination according to claim 1 wherein said barb support member is a cylindrical member.

3. The combination according to claim 2 wherein the rear shoulder portion of said main body member is circular, with a diameter greater than the diameter of said cross-section of said barb support member.

4. The combination according to claim 3 wherein said barb means is formed from a single piece of elongated, cylindrical material.

5. The combination according to claim 4 wherein the material of said barb means is spring steel.

6. The combination according to claim 5 wherein said elongated barb portion has an elongated straight barb extending from the ring portion thereof and terminating in a sharpened tip.

7. The combination according to claim 6 wherein the sharpened tip of said barb is formed by cutting the end of said barb at an acute angle.

8. The combination according to claim 7 further including a second shoulder on said support member spaced a predetermined distance from the rear shoulder portion of said main body member for loosely accommodating the ring portion of said floating barb means thereon, wherein said means for attaching the second end of said support member to an arrow shaft is coupled to said second shoulder.

9. The combination according to claim 8 wherein the elongated portion of said floating barb means extends from the ring portion thereof rearwardly away from said penetrating point.

10. The combination according to claim 9 wherein said second shoulder tapers from its greatest dimension on the side facing the rear shoulder portion of said main body member toward said means for attaching said second end of said support member to permit sliding of the ring portion of said floating barb means over such taper to seat the ring portion of said barb means on the barb support member.

11. The combination according to claim 1 wherein the rear shoulder portion of said main body member is circular, with a diameter greater than the diameter of said cross-section of said barb support member.

12. The combination according to claim 1 wherein said barb means is formed from a single piece of elongated, cylindrical material.

13. The combination according to claim 12 wherein the material of said barb means is spring steel.

14. The combination according to claim 13 wherein said elongated barb portion has an elongated straight barb extending from the ring portion thereof and terminating in a sharpened tip.

15. The combination according to claim 14 wherein the sharpened tip of said barb is formed by cutting the end of said barb at an acute angle.

16. The combination according to claim 1 further including a second shoulder on said support member spaced a predetermined distance from the rear shoulder portion of said main body member for loosely accommodating the ring portion of said floating barb means thereon, wherein said means for attaching the second end of said support member to an arrow shaft is coupled to said second shoulder.

17. The combination according to claim 16 wherein said second shoulder tapers from its greatest dimension on the side facing the rear shoulder portion of said main body member toward said means for attaching said second end of said support member to permit sliding of the ring portion of said floating barb means over such taper to seat the ring portion of said barb means on the barb support member.

18. The combination according to claim 16 wherein said barb support member is a cylindrical member.

* * * * *